United States Patent
Fredslund et al.

(10) Patent No.: US 10,724,778 B2
(45) Date of Patent: Jul. 28, 2020

(54) METHOD FOR CONTROLLING A FAN OF A VAPOUR COMPRESSION SYSTEM IN ACCORDANCE WITH A VARIABLE TEMPERATURE SETPOINT

(71) Applicant: Danfoss A/S, Danfoss Intellectual Property, Nordborg (DK)

(72) Inventors: Kristian Fredslund, Haderslev (DK); Frede Schmidt, Sonderborg (DK); Jan Prins, Nordborg (DK)

(73) Assignee: DANFOSS A/S, Nordborg (DK)

( * ) Notice: Subject to any disclaimer, the term of this patent is extended or adjusted under 35 U.S.C. 154(b) by 99 days.

(21) Appl. No.: 16/071,139

(22) PCT Filed: Feb. 3, 2017

(86) PCT No.: PCT/EP2017/052366
§ 371 (c)(1),
(2) Date: Jul. 19, 2018

(87) PCT Pub. No.: WO2017/134215
PCT Pub. Date: Aug. 10, 2017

(65) Prior Publication Data
US 2019/0323752 A1    Oct. 24, 2019

(30) Foreign Application Priority Data
Feb. 3, 2016   (DK) .................. 2016 00071

(51) Int. Cl.
*F25B 49/02* (2006.01)
*F24F 11/77* (2018.01)
*F24F 140/20* (2018.01)

(52) U.S. Cl.
CPC ......... *F25B 49/027* (2013.01); *F24F 11/77* (2018.01); *F24F 2140/20* (2018.01);
(Continued)

(58) Field of Classification Search
CPC ............... F25B 49/027; F25B 2500/19; F25B 2600/111; F25B 2700/2103;
(Continued)

(56) References Cited

U.S. PATENT DOCUMENTS

2007/0125106 A1   6/2007  Ishikawa et al.
2007/0227168 A1   10/2007 Simmons

FOREIGN PATENT DOCUMENTS

EP           1398576 A2   3/2004
WO     2013/156158 A1    10/2013

OTHER PUBLICATIONS

International Search Report for PCT Serial No. PCT/EP2017/052366 dated Apr. 4, 2017.

*Primary Examiner* — Ana M Vazquez
(74) *Attorney, Agent, or Firm* — McCormick, Paulding & Huber PLLC

(57) ABSTRACT

A method for controlling a fan (6) of a vapour compression system (1) is disclosed, the fan (6) being arranged to provide a secondary fluid flow across a heat rejecting heat exchanger (3). A temperature difference, $\Delta T = T_{out} - T_{amb}$, between a temperature, $T_{out}$, of refrigerant leaving the heat rejecting heat exchanger (3) and a temperature, $T_{amb}$, of ambient air of the heat rejecting heat exchanger (3) is established. A setpoint value, $\Delta T_{setp}$, for the temperature difference, $\Delta T$, is obtained, the setpoint value, $\Delta T_{setp}$, being dependent on the fan speed of the fan (6) in such a manner that the setpoint value, $\Delta T_{setp}$, increases as the fan speed increases. The fan speed of the fan (6) is controlled in order to control the temperature difference, $\Delta T$, in accordance with the obtained setpoint value, $\Delta T_{setp}$.

20 Claims, 3 Drawing Sheets

(52) U.S. Cl.
CPC ..... *F25B 2500/19* (2013.01); *F25B 2600/111* (2013.01); *F25B 2700/2103* (2013.01); *F25B 2700/2116* (2013.01); *F25B 2700/21163* (2013.01)

(58) Field of Classification Search
CPC .... F25B 2700/2116; F25B 2700/21163; F25B 2700/2104; F24F 11/77; F24F 2140/20; Y02B 30/743
See application file for complete search history.

METHOD FOR CONTROLLING A FAN OF A VAPOUR COMPRESSION SYSTEM IN ACCORDANCE WITH A VARIABLE TEMPERATURE SETPOINT

CROSS-REFERENCE TO RELATED APPLICATION

This application is a National Stage application of International Patent Application No. PCT/EP2017/052366, filed on Feb. 3, 2017, which claims priority to Danish patent application no. PA201600071, filed on Feb. 3, 2016, each of which is hereby incorporated by reference in its entirety.

TECHNICAL FIELD

The present invention relates to a method for controlling a fan of a vapour compression system, such as a fan providing a secondary fluid flow across a heat rejecting heat exchanger. The fan speed of the fan is controlled on the basis of a temperature setpoint value which varies as a function of the fan speed. The present invention further provides a method for adjusting the temperature setpoint value.

BACKGROUND

Vapour compression systems, such as refrigeration systems, air condition systems, heat pumps, etc., normally comprise a compressor, a heat rejecting heat exchanger, an expansion device and an evaporator arranged in a refrigerant circuit. In the heat rejecting heat exchanger, heat exchange takes place between the refrigerant flowing through the heat rejecting heat exchanger and the ambient, e.g. in the form of a secondary fluid flow across the heat rejecting heat exchanger, in such a manner that heat is rejected from the refrigerant. Accordingly, the temperature of the refrigerant decreases as the refrigerant passes through the heat rejecting heat exchanger.

In the case that the secondary fluid flow across the heat rejecting heat exchanger is in the form of an air flow, the secondary fluid flow may be controlled by controlling a fan arranged in the vicinity of the heat rejecting heat exchanger. It is normally desirable to control the fan, and thereby the secondary fluid flow across the heat rejecting heat exchanger, in such a manner that the temperature of the refrigerant leaving the heat rejecting heat exchanger is close to the ambient temperature, e.g. close to the temperature of the fluid of the secondary fluid flow. Thereby it is ensured that the pressure of the refrigerant flowing through the heat rejecting heat exchanger is at an appropriate level, and that the vapour compression system is operated in an energy efficient manner.

In order to control the secondary fluid flow as described above, various temperatures, such as the temperature of refrigerant leaving the heat rejecting heat exchanger, the temperature of refrigerant entering the heat rejecting heat exchanger and/or various ambient temperatures, etc., may be measured. Each of the sensors used for measuring the relevant temperatures introduces an uncertainty of the measured temperature, which may result in a deviation between a measured temperature value and the actual temperature value. When the temperature of refrigerant leaving the heat rejecting heat exchanger approaches the ambient temperature, even small deviations in the measured temperature values may result in erroneous operation of the fan. For instance, if the temperature measurements performed by means of the temperature sensors indicate that the temperature difference between the temperature of refrigerant leaving the heat rejecting heat exchanger and the ambient temperature is above a desired level, but the temperature of the refrigerant leaving the heat rejecting heat exchanger is in reality as close to the ambient temperature as possible, the control algorithm may keep requesting an increase of the fan speed in order to further reduce the temperature of the refrigerant leaving the heat rejecting heat exchanger, but this will have no effect because it is not possible to reduce this temperature further. This is an undesirable situation, because it increases the energy consumption, the noise level, as well as the wear on the fan, without improving the overall energy efficiency of the vapour compression system.

WO 2013/156158 A1 discloses a method for controlling a fan of a vapour compression system, the fan being arranged to provide a secondary fluid flow across a heat rejecting heat exchanger of the vapour compression system. A temperature difference between a temperature of refrigerant leaving the heat rejecting heat exchanger and a temperature of ambient air is established. The temperature difference is compared to a first threshold value and a second threshold value, and the rotational speed of the fan is controlled on the basis of the comparison. The first and second threshold values are substantially constant.

US 2007/0125106 A1 discloses a supercritical refrigeration cycle comprising a heat rejecting heat exchanger in the form of a radiator, and a cooling fan for blowing the atmospheric air to the radiator. A value of information representing the difference between the actual radiation state of the refrigerant at the outlet of the radiator and an ideal radiation state determined by the atmospheric temperature is calculated, and based on this value of information, the air capacity of the cooling fan is controlled to decrease the difference.

SUMMARY

It is an object of embodiments of the invention to provide a method for controlling a fan of a vapour compression system in such a manner that energy efficient operation of the vapour compression system is ensured.

It is a further object of embodiments of the invention to provide a method for controlling a fan of a vapour compression system in such a manner that noise and energy consumption of the fan are minimised.

According to a first aspect the invention provides a method for controlling a fan of a vapour compression system, the vapour compression system comprising a compressor, a heat rejecting heat exchanger, an expansion device and an evaporator arranged in a refrigerant circuit, said fan being arranged to provide a secondary fluid flow across the heat rejecting heat exchanger, the method comprising the steps of:

establishing a temperature difference, $\Delta T = T_{out} - T_{amb}$, between a temperature, $T_{out}$, of refrigerant leaving the heat rejecting heat exchanger and a temperature, $T_{amb}$, of ambient air of the heat rejecting heat exchanger, establishing a fan speed of the fan, obtaining a setpoint value, $\Delta T_{setp}$, for the temperature difference, $\Delta T$, based on the established fan speed of the fan, said setpoint value, $\Delta T_{setp}$, being dependent on the fan speed in such a manner that the setpoint value, $\Delta T_{setp}$, increases as the fan speed increases, and controlling the fan speed of the fan in order to control the temperature difference, $\Delta T$, in accordance with the obtained setpoint value, $\Delta T_{setp}$.

The method according to the first aspect of the invention is a method for controlling a fan of a vapour compression system. In the present context the term 'vapour compression system' should be interpreted to mean any system in which a flow of fluid, such as refrigerant, circulates and is alternatingly compressed and expanded, thereby providing either refrigeration or heating of a volume. Thus, the vapour compression system may be a refrigeration system, an air condition system, a heat pump, etc.

The vapour compression system comprises a compressor, a heat rejecting heat exchanger, e.g. in the form of a gas cooler or a condenser, an expansion device, e.g. in the form of an expansion valve, and an evaporator arranged along a refrigerant circuit. Refrigerant flowing in the refrigerant circuit is thereby alternatingly compressed by the compressor and expanded by the expansion device, while heat exchange takes place in the heat rejecting heat exchanger and in the evaporator, in such a manner that heat is rejected from the refrigerant passing through the heat rejecting heat exchanger and heat is absorbed by the refrigerant passing through the evaporator.

The vapour compression system further comprises a fan being arranged to provide a secondary fluid flow across the heat rejecting heat exchanger. The secondary fluid flow may be a flow of air, or a flow of another gas than air, driven by the fan. Thus, heat exchange takes place between the refrigerant flowing through the heat rejecting heat exchanger and the fluid of the secondary fluid flow. Furthermore, the heat transfer from the refrigerant to the fluid of the secondary fluid flow is dependent on the flow rate of the secondary fluid flow, and thereby on the fan speed of the fan.

It should be noted that the vapour compression system may comprise two or more fans arranged to provide the secondary fluid flow across the heat rejecting heat exchanger. Therefore, in the following the term 'fan' should be interpreted to cover a single fan providing the secondary fluid flow, one of two or more fans providing the secondary fluid flow, or two or more fans providing the secondary fluid flow. In the case that two or more fans are arranged to provide the secondary fluid, the 'fan speed' could be varied by switching one or more of the fans on or off. In this case the individual fan is not necessarily a variable speed fan, but switching one of the fans on or off will correspond to increasing or decreasing the speed of a single fan providing the fluid flow in a stepwise manner.

According to the method of the first aspect of the invention, a temperature difference, $\Delta T=T_{out}-T_{amb}$, between a temperature, $T_{out}$, of refrigerant leaving the heat rejecting heat exchanger and a temperature, $T_{amb}$, of ambient air of the heat rejecting heat exchanger is initially established. The temperatures, $T_{out}$ and $T_{amb}$, may each be obtained, e.g. by direct measurements, and the temperature difference, $\Delta T$, may be established based on the obtained temperatures. As an alternative, the temperature difference, $\Delta T$, may be established directly without obtaining the absolute values of the temperatures, $T_{out}$ and $T_{amb}$.

The ambient temperature, $T_{amb}$, is a temperature prevailing in the vicinity of the heat rejecting heat exchanger. It could, e.g., be a temperature of the secondary fluid flow, such as the temperature of fluid flowing towards the heat rejecting heat exchanger, the temperature of fluid flowing away from the heat rejecting heat exchanger, or a suitable weighted average of these two temperatures. As an alternative, the ambient temperature, $T_{amb}$, may be another suitable temperature prevailing in the vicinity of the heat rejecting heat exchanger, such as an outdoor temperature.

$\Delta T$ indicates how close the temperature of refrigerant leaving the heat rejecting heat exchanger is to the ambient temperature, since $\Delta T$ approaches zero when $T_{out}$ approaches $T_{amb}$. As described above, it is desirable to operate the vapour compression system in such a manner that the temperature difference, $\Delta T$, is small. In this case the pressure of refrigerant passing through the heat rejecting heat exchanger can be maintained at a relatively low level. This, in turn, ensures that the energy consumption of the compressor can be maintained at a relatively low level. As a consequence, the vapour compression system is operated in an energy efficient manner. On the other hand, the fan speed should be reduced when the temperature difference, $\Delta T$, reaches a desirable, low level, in order to minimise energy consumption of the fan, wear on the fan and noise of the fan.

Next, a fan speed of the fan is established. The fan speed may be obtained from a controller controlling the fan. Alternatively or additionally, the fan speed may be measured.

Next, a setpoint value, $\Delta T_{setp}$, for the temperature difference, $\Delta T$, is obtained, based on the established fan speed of the fan. The setpoint value, $\Delta T_{setp}$, is dependent on the fan speed in such a manner that the setpoint value, $\Delta T_{setp}$ increases as the fan speed increases. Thus, the setpoint value, $\Delta T_{setp}$, for the temperature difference, $\Delta T$, is not a fixed value, but varies as a function of the fan speed of the fan. This has the consequence that when the fan speed increases, the setpoint value, $\Delta T_{setp}$, also increases, and the temperature difference, $\Delta T$, is thereby controlled in accordance with a higher setpoint, i.e. a larger temperature difference, $\Delta T$, is allowed.

In order to decrease the temperature difference, $\Delta T$, the heat transfer from the refrigerant to the secondary fluid flow must be increased. This can be obtained by increasing the fan speed of the fan, thereby increasing the flow rate of the secondary fluid flow. Accordingly, if the established temperature difference, $\Delta T$, is larger than a desired level, the fan speed will normally be increased, in order to reduce the temperature difference, $\Delta T$, further. However, temperature sensors used for measuring $T_{out}$ and/or $T_{amb}$ may be inaccurate. In this case, the actual temperature difference, $\Delta T$, may very well be so small that it is, in practice, not possible to lower it further, even though the established value of the temperature difference, $\Delta T$, is above the desired level. In this case, the controller will attempt to decrease the temperature difference, $\Delta T$, by increasing the fan speed, but the increased fan speed will have no effect on the temperature difference, $\Delta T$, because it is in reality not possible to reduce the temperature difference further. This has the consequence that the fan speed of the fan continues to increase until it reaches a maximum value, resulting in a high energy consumption of the fan and a high noise level.

It is therefore an advantage of the present invention that the setpoint value, $\Delta T_{setp}$, for the temperature difference, $\Delta T$, is increased when the fan speed of the fan increases. Thereby it is ensured that, if the fan is already operating at a high speed, a larger temperature difference, $\Delta T$, is allowed before a further increase in fan speed is requested. This prevents that the fan speed is continuously increased in the case that the situation described above occurs, and the energy consumption as well as the noise level of the fan can be maintained at a minimum level without risking that the vapour compression system is operated inefficiently.

Finally, the fan speed of the fan is controlled in order to control the temperature difference, $\Delta T$, in accordance with the obtained setpoint value, $\Delta T_{setp}$. Thereby the advantages described above are obtained. Controlling the temperature difference, $\Delta T$, in accordance with the obtained setpoint value, $\Delta T_{setp}$, could, e.g., include controlling the fan speed in such a manner that a temperature difference, $\Delta T$, being substantially equal to the obtained setpoint value, $\Delta T_{setp}$, is obtained. Alternatively or additionally, the setpoint value, $\Delta T_{setp}$, may be applied as a minimum value or a maximum value for the temperature difference, $\Delta T$.

The step of controlling the fan speed of the fan may comprise controlling the fan speed in order to obtain that the temperature difference, $\Delta T$, is larger than or equal to the obtained setpoint value, $\Delta T_{setp}$. According to this embodiment, the setpoint value, $\Delta T_{setp}$, can be regarded as a minimum value for the temperature difference, $\Delta T$, and the temperature difference, $\Delta T$, will not be allowed to decrease below the setpoint value, $\Delta T_{setp}$. Since the setpoint value, $\Delta T_{setp}$, increases as the fan speed increases, a higher fan speed will result in a larger setpoint value, $\Delta T_{setp}$ and thereby a higher minimum value for the temperature difference, $\Delta T$. Accordingly, at a relatively high fan speed, the setpoint value, $\Delta T_{setp}$, and thereby the minimum value for the temperature difference, $\Delta T$, is also relatively high. Therefore, when this situation occurs, it will not be attempted to further reduce the temperature difference, $\Delta T$, below the relatively high setpoint value, $\Delta T_{setp}$, by further increasing the fan speed. Thereby it is efficiently prevented that the fan speed is increased indefinitely in pursuit of a very small temperature difference, $\Delta T$, which is in practise unobtainable.

Furthermore, during operation, if temperature difference, $\Delta T$, is above the setpoint value, $\Delta T_{setp}$, the fan speed may be increased in order to decrease the temperature difference, $\Delta T$. This will, in addition to decreasing the temperature difference, $\Delta T$, cause an increase in the setpoint value, $\Delta T_{setp}$. This has the consequence that at some point the temperature difference, $\Delta T$, decreases below the setpoint value, $\Delta T_{setp}$, and the control of the fan speed and the temperature difference, $\Delta T$, will stabilize.

Similarly, if the temperature difference, $\Delta T$, is below the setpoint value, $\Delta T_{setp}$ the fan speed may be decreased in order to increase the temperature difference, $\Delta T$, to a level above the setpoint value, $\Delta T_{setp}$. This causes the temperature difference, $\Delta T$, to increase and the setpoint value, $\Delta T_{setp}$, to decrease. At some point the temperature difference, $\Delta T$, increases above the setpoint value, $\Delta T_{setp}$ and the control of the fan speed and the temperature difference, $\Delta T$, will stabilize.

The step of obtaining a setpoint value, $\Delta T_{setp}$, may comprises consulting a look-up table and/or applying a function providing corresponding values of fan speed and setpoint value, $\Delta T_{setp}$. According to this embodiment, the relationship between the fan speed and the setpoint value, $\Delta T_{setp}$, is predefined by the look-up table and/or the function. At a given fan speed, the corresponding setpoint value, $\Delta T_{setp}$, is thereby readily available from the look-up table and/or the function. In the case that a function provides the corresponding values of fan speed and setpoint value, $\Delta T_{setp}$, the setpoint value, $\Delta T_{setp}$, may, e.g., be obtained by reading a graph representing the function, and/or it may be calculated using a formula representing the function.

The look-up table and/or the function may be derived in a theoretical manner, e.g. including performing calculations based on theoretical assumptions and/or various system specific parameters. Alternatively, the look-up table and/or the function may be generated at least partly in an empirical manner.

As an alternative, the setpoint value, $\Delta T_{setp}$, may be obtained in any other suitable manner, such as by direct calculation, e.g. involving other measured parameters of the system.

The setpoint value, $\Delta T_{setp}$, may vary as a linear or piecewise linear function of the fan speed. In this case the setpoint value, $\Delta T_{setp}$, increases in a linear manner when the fan speed increases. The slope of the linear function may, e.g., be determined by defining a maximum setpoint value to be applied at maximum fan speed, and a minimum setpoint value to be applied at a selected, low fan speed, and defining the linear function between these two points.

In the case that the setpoint value, $\Delta T_{setp}$, varies as a piecewise linear function of the fan speed, the setpoint value, $\Delta T_{setp}$, could, e.g., be substantially constant at low fan speeds, and increase linearly as a function of fan speeds above a specified or selected threshold fan speed.

As an alternative, the setpoint value, $\Delta T_{setp}$, may vary in any other suitable manner, as long as the setpoint value, $\Delta T_{setp}$, increases as a function of fan speed, at least in a part of the available fan speed range.

The step of controlling the fan speed of the fan may comprise the steps of:
  comparing the established temperature difference, $\Delta T$, to the obtained setpoint value, $\Delta T_{setp}$, and
  decreasing the fan speed of the fan in the case that $\Delta T < \Delta T_{setp}$.

According to this embodiment, if the temperature difference, $\Delta T$, is below the setpoint value, $\Delta T_{setp}$, at the current fan speed, then it is desirable to increase the temperature difference, $\Delta T$, in order to reach the level defined by the setpoint value, $\Delta T_{setp}$. In order to obtain this, the fan speed is decreased. As described above, this will decrease the flow rate of the secondary fluid flow across the heat rejecting heat exchanger, resulting in an increase in the temperature, $T_{out}$, of refrigerant leaving the heat rejecting heat exchanger, and thereby an increase in the temperature difference, $\Delta T$. Furthermore, the decrease in fan speed causes the setpoint value, $\Delta T_{setp}$, to decrease. The increasing temperature difference, $\Delta T$, and the simultaneously decreasing setpoint value, $\Delta T_{setp}$, causes the temperature difference, $\Delta T$, and the setpoint value, $\Delta T_{setp}$, to approach each other until they finally reach the same level, and the control stabilizes.

The step of controlling the fan speed of the fan may further comprise the step of increasing the fan speed of the fan in the case that $\Delta T > \Delta T_{setp}$. According to this embodiment, if the temperature difference, $\Delta T$, is above the setpoint value, $\Delta T_{setp}$ at the current fan speed, then it is desirable to decrease the temperature difference, $\Delta T$, in order to reach the level defined by the setpoint value, $\Delta T_{setp}$, and in order to improve the energy efficiency of the vapour compression system. In order to obtain this, the fan speed is increased. As described above, this will increase the flow rate of the secondary fluid flow across the heat rejecting heat exchanger, resulting in a decrease in the temperature, $T_{out}$, of refrigerant leaving the heat rejecting heat exchanger, and thereby a decrease in the temperature difference, $\Delta T$. Furthermore, the increase in fan speed causes the setpoint value, $\Delta T_{setp}$, to increase. The decreasing temperature difference, $\Delta T$, and the simultaneously increasing setpoint value, $\Delta T_{setp}$, causes the temperature difference, $\Delta T$, and the setpoint value, $\Delta T_{setp}$, to approach each other until they finally reach the same level, and the control stabilizes.

The step of obtaining a setpoint value, $\Delta T_{setp}$, may comprise the steps of:

obtaining a minimum setpoint value, $\Delta T_{setp,min}$, being dependent on the fan speed in such a manner that the minimum setpoint value, $\Delta T_{setp,min}$, increases as the fan speed increases, obtaining a system defined setpoint value, $\Delta T_{setp,sys}$, and selecting the setpoint value, $\Delta T_{setp}$, as the largest of the minimum setpoint value, $\Delta T_{setp,min}$, and the system defined setpoint value, $\Delta T_{setp,sys}$, $\Delta T_{setp} = \max\{\Delta T_{setp,min}; \Delta T_{setp,sys}\}$.

According to this embodiment, the setpoint value, $\Delta T_{setp}$, is obtained while taking a system defined setpoint value, $\Delta T_{setp,sys}$, into consideration and providing the required increasing behaviour of the setpoint value, $\Delta T_{setp}$, as a function of fan speed.

For instance, the system defined setpoint value, $\Delta T_{setp,sys}$, could be a manually set or user defined value. Alternatively or additionally, the system defined setpoint value, $\Delta T_{setp,sys}$, could be a value which is dictated by other parts of the vapour compression system, such as a heat recovery system forming part of or being connected to the vapour compression system.

The system defined setpoint value, $\Delta T_{setp,sys}$, may be a substantially constant value, e.g. representing a desired level for the temperature difference, $\Delta T$, such as a level which ensures energy efficient operation of the vapour compression system. Alternatively, the system defined setpoint value, $\Delta T_{setp,sys}$, may be allowed to vary, preferably on a relatively long timescale. This may, e.g., be the case if the system defined setpoint value, $\Delta T_{setp,sys}$, is dictated by other parts of the vapour compression system. In this case it may be appropriate that the system defined setpoint value, $\Delta T_{setp,sys}$, is adjusted if relevant operating conditions change. In any event, the system defined setpoint value, $\Delta T_{setp,sys}$, may be regarded as a setpoint value for the temperature difference, $\Delta T$, which would also be appropriate if accurate temperature measurements could be ensured, and the problems described above would therefore not occur. Furthermore, the system defined setpoint value, $\Delta T_{setp,sys}$, may be independent of the fan speed.

The minimum setpoint value, $\Delta T_{setp,min}$, defines the required increasing behaviour of the setpoint value, $\Delta T_{setp}$, as a function of fan speed. At low fan speeds, the minimum setpoint value, $\Delta T_{setp,min}$, is therefore very low, and at high fan speeds it is very high.

According to this embodiment, the setpoint value, $\Delta T_{setp}$, is selected as the largest of the minimum setpoint value, $\Delta T_{setp,min}$, and the system defined setpoint value, $\Delta T_{setp,sys}$, i.e. $\Delta T_{setp} = \max\{\Delta T_{setp,min}; \Delta T_{setp,sys}\}$. Thus, at low fan speeds where the minimum setpoint value, $\Delta T_{setp,min}$, is smaller than the system defined setpoint value, $\Delta T_{setp,sys}$, the system defined setpoint value, $\Delta T_{setp,sys}$, is selected as the setpoint value, $\Delta T_{setp}$. However, at higher fan speeds where the minimum setpoint value, $\Delta T_{setp,min}$, increases above the system defined setpoint value, $\Delta T_{setp,sys}$, the minimum setpoint value, $\Delta T_{setp,min}$, is instead selected as the setpoint value, $\Delta T_{setp}$. Thereby it is ensured, that at low fan speeds where the problems described above are not expected to occur, the fan can be controlled in a usual manner, and in order to obtain a desired, low temperature difference, $\Delta T$. However, at higher fan speeds, where the problems described above are likely to occur, the setpoint value, $\Delta T_{setp}$, is increased as described above, thereby avoiding that the fan speed is continuously increased, due to inaccurate temperature measurements.

The step of establishing a temperature difference, $\Delta T$, may comprise obtaining the temperature, $T_{out}$, of refrigerant leaving the heat rejecting heat exchanger and obtaining the temperature, $T_{amb}$, of ambient air of the heat rejecting heat exchanger. The temperatures may, e.g., be obtained by measuring the temperatures directly, using appropriate temperature sensors. As an alternative, one or both of the temperatures may be obtained in a more indirect manner, e.g. by measuring another value which is indicative for the relevant temperature, and subsequently calculating or deriving the temperature on the basis of the measured value.

As an alternative, the temperature difference, $\Delta T$, may be established directly, without obtaining the absolute values of the temperatures, $T_{out}$ and $T_{amb}$.

According to a second aspect the invention provides a method for adjusting a setpoint value for a temperature difference, $\Delta T$, related to a vapour compression system, the vapour compression system comprising a compressor, a heat rejecting heat exchanger, an expansion device and an evaporator arranged in a refrigerant circuit, the vapour compression system further comprising a fan arranged to provide a secondary fluid flow across the heat rejecting heat exchanger, the temperature difference, $\Delta T = T_{out} - T_{amb}$, being a temperature difference between a temperature, $T_{out}$, of refrigerant leaving the heat rejecting heat exchanger and a temperature, $T_{amb}$, of ambient air of the heat rejecting heat exchanger, the method comprising the steps of:

establishing a fan speed of the fan, and obtaining a setpoint value, $\Delta T_{setp}$, for the temperature difference, $\Delta T$, based on the established fan speed of the fan, said setpoint value, $\Delta T_{setp}$, being dependent on the fan speed in such a manner that the setpoint value, $\Delta T_{setp}$, increases as the fan speed increases.

It should be noted that a person skilled in the art would readily recognise that any features disclosed in combination with the first aspect of the invention could also be combined with the second aspect of the invention, and vice versa. The remarks set forth above are therefore equally applicable here.

The method according to the second aspect of the invention is a method for adjusting a setpoint value for a temperature difference, $\Delta T$. This method could, e.g., form part of the method according to the first aspect of the invention, and the steps of the method according to the second aspect of the invention have already been described above.

The step of obtaining a setpoint value, $\Delta T_{setp}$, may comprise consulting a look-up table and/or applying a function providing corresponding values of fan speed and setpoint value, $\Delta T_{setp}$. This has already been described above with reference to the first aspect of the invention.

The setpoint value, $\Delta T_{setp}$, may vary as a linear or piecewise linear function of the fan speed. This has already been described above with reference to the first aspect of the invention.

The step of obtaining a setpoint value, $\Delta T_{setp}$, may comprise the steps of:

obtaining a minimum setpoint value, $\Delta T_{setp,min}$, being dependent on the fan speed in such a manner that the minimum setpoint value, $\Delta T_{setp,min}$, increases as the fan speed increases, obtaining a system defined setpoint value, $\Delta T_{setp,sys}$, being a substantially constant setpoint value, and selecting the setpoint value, $\Delta T_{setp}$, as the largest of the minimum setpoint value, $\Delta T_{setp,min}$, and the system defined setpoint value, $\Delta T_{setp,sys}$, $\Delta T_{setp} = \max\{\Delta T_{setp,min}; \Delta T_{setp,sys}\}$.

This has already been described above with reference to the first aspect of the invention.

The step of establishing a temperature difference, $\Delta T$, may comprise obtaining the temperature, $T_{out}$, of refrigerant leaving the heat rejecting heat exchanger and obtaining the temperature, $T_{amb}$, of ambient air of the heat rejecting heat exchanger. This has already been described above with reference to the first aspect of the invention.

BRIEF DESCRIPTION OF THE DRAWINGS

The invention will now be described in further detail with reference to the accompanying drawings in which.

DETAILED DESCRIPTION

Figure 1:
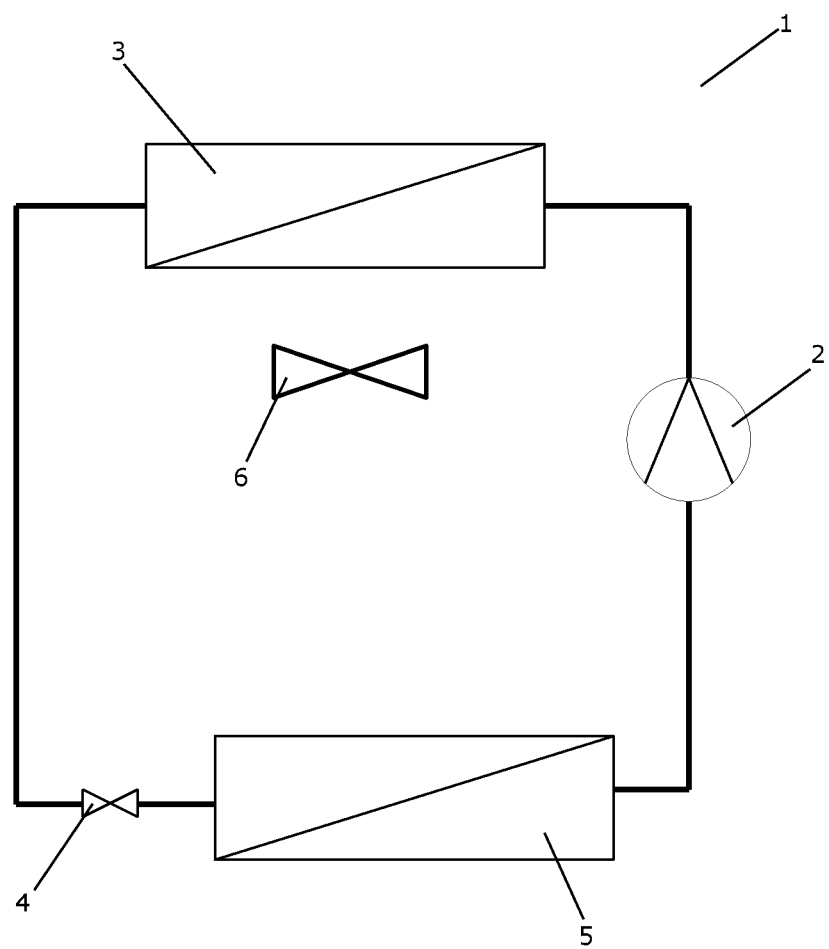
FIG. 1 is a diagrammatic view of a vapour compression system comprising a fan being operated in accordance with a method according to an embodiment of the invention.

FIG. 1 is a diagrammatic view of a vapour compression system 1 comprising a compressor 2, a heat rejecting heat exchanger 3, an expansion valve 4 and an evaporator 5 arranged in a refrigerant circuit. A fan 6 is arranged to provide a secondary fluid flow across the heat rejecting heat exchanger 3.

In the heat rejecting heat exchanger 3 heat exchange takes place between refrigerant passing through the heat rejecting heat exchanger 3 and the fluid of the secondary fluid flow, in such a manner that heat is rejected from the refrigerant and absorbed by the fluid of the secondary fluid flow. The heat transfer from the refrigerant to the fluid of the secondary fluid flow is, among other things, determined by the flow rate of the secondary fluid flow across the heat rejecting heat exchanger 3. Thus, an increase in the flow rate of the secondary fluid flow will cause an increase in the heat transfer, and a decrease in the flow rate of the secondary fluid flow will cause a decrease in the heat transfer.

The flow rate of the secondary fluid flow across the heat rejecting heat exchanger 3 is determined by the fan speed of the fan 6. Thereby the heat transfer from the refrigerant to the fluid of the secondary fluid flow across the heat rejecting heat exchanger 3 is also dependent on the fan speed of the fan 6. Thus, by appropriately controlling the fan speed of the fan 6, the heat transfer taking place in the heat rejecting heat exchanger 3 can be controlled, and thereby the temperature of refrigerant leaving the heat rejecting heat exchanger 3 can be controlled.

As described above, it is often desirable to control the temperature, $T_{out}$, of refrigerant leaving the heat rejecting heat exchanger 3 in such a manner that this temperature is close to an ambient temperature, $T_{amb}$, such as a temperature of the fluid of the secondary fluid flow across the heat rejecting heat exchanger 3 or an outdoor temperature, i.e. in such a manner that a temperature difference, $\Delta T = T_{out} - T_{amb}$ is small. However, at small temperature differences, uncertainties of the temperature sensors may lead to incorrect measured values of the temperature difference, $\Delta T$. In this case the measured temperature values may indicate that the temperature difference, $\Delta T$, is above a desired level, while the actual temperature difference is at or below this level, and that it is not possible to reduce the temperature difference further. In this case, the fan speed may be continuously increased in an attempt to decrease the temperature difference, but the increase in fan speed will have no effect in this regard, because the actual temperature difference is already at a minimum level. However, according to the method of the invention, this situation is avoided by obtaining a setpoint value, $\Delta T_{setp}$, for the temperature difference, $\Delta T$, which increases as the fan speed increases.

Figure 2:
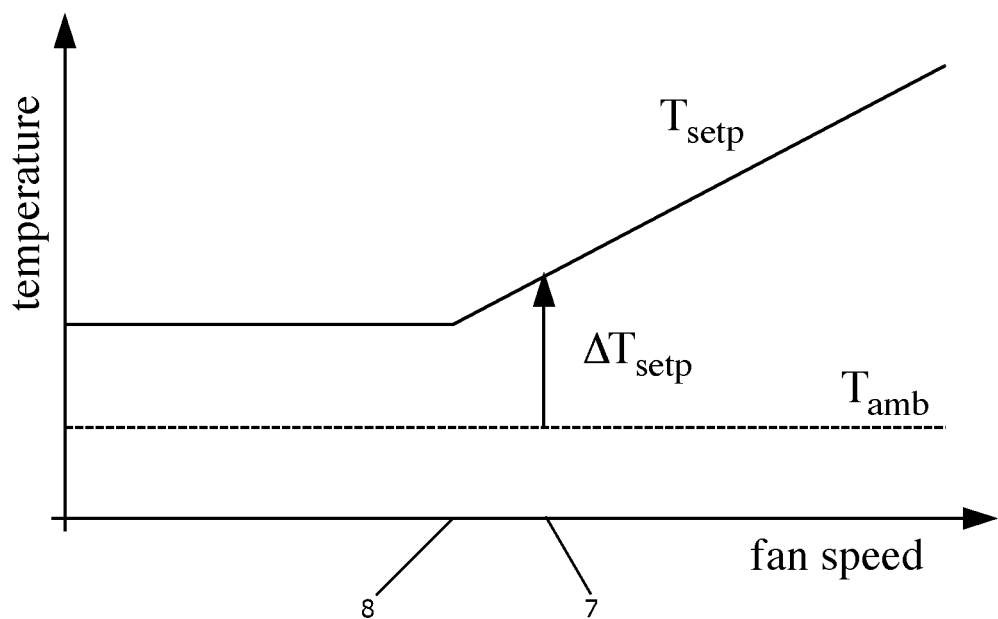
FIG. 2 illustrates obtaining a setpoint value in accordance with a method according to an embodiment of the invention.

FIG. 2 is a graph illustrating the step of obtaining a setpoint value, using a method according to an embodiment of the invention. The graph illustrates temperature as a function of fan speed.

In the graph, a constant ambient temperature, $T_{amb}$, is shown as a dashed line. Thus, in the example illustrated in FIG. 2 it is assumed that the ambient temperature, $T_{amb}$, is constant. It should, however, be noted that the ambient temperature, $T_{amb}$, could be variable, but the principles described below will still be valid in this case.

A setpoint value, $\Delta T_{setp}$, for a temperature difference between a temperature, $T_{out}$, of refrigerant leaving a heat rejecting heat exchanger and the ambient temperature, $T_{amb}$, is dependent on the fan speed in such a manner that the setpoint value, $\Delta T_{setp}$, increases as the fan speed increases. The setpoint value, $\Delta T_{setp}$, is indicated at a specific fan speed 7.

For a given fan speed, a temperature setpoint, $T_{setp}$, is calculated as the sum of the ambient temperature, $T_{amb}$, and the fan speed dependent setpoint value, $\Delta T_{setp}$. In FIG. 2, $T_{setp}$ is illustrated by a solid line.

It can be seen that the setpoint value, $\Delta T_{setp}$, is a piecewise linear function of the fan speed. At fan speeds below fan speed 8 the setpoint value, $\Delta T_{setp}$, is a constant value, and at fan speeds above fan speed 8, $\Delta T_{setp}$ increases linearly as a function of fan speed.

The temperature, $T_{out}$, of refrigerant leaving the heat rejecting heat exchanger may be controlled in accordance with the temperature setpoint, $T_{setp}$.

Figure 3:
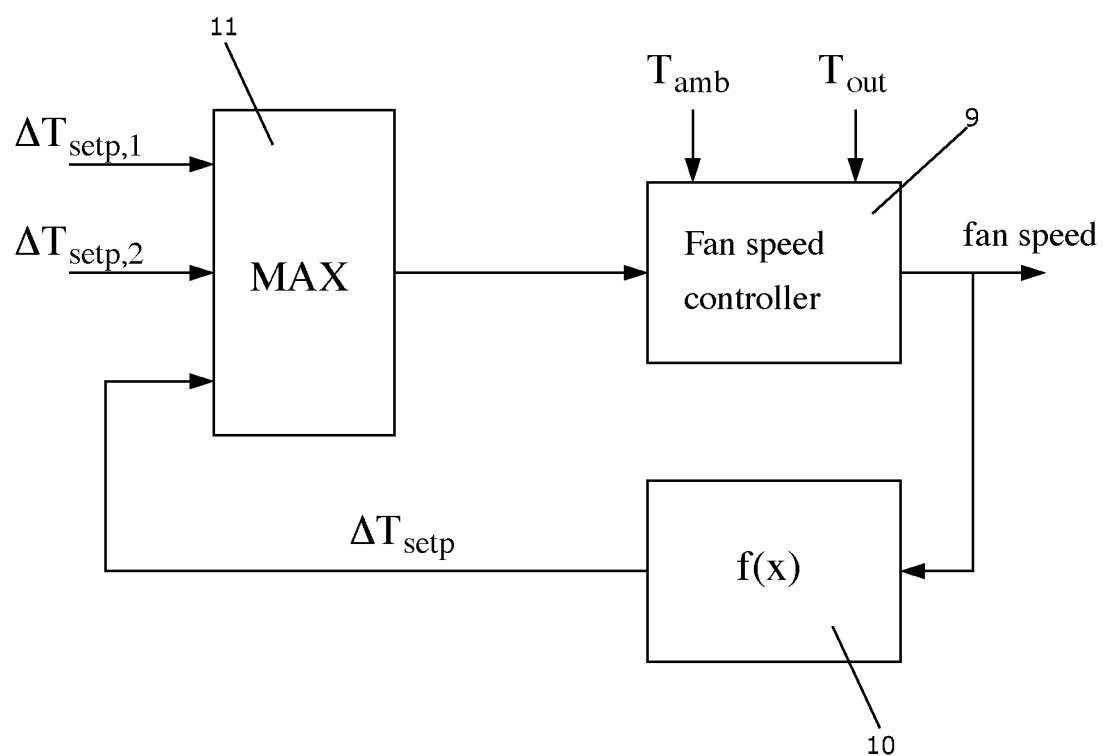
FIG. 3 is a block diagram illustrating a method for controlling a fan according to an embodiment of the invention.

FIG. 3 is a block diagram illustrating a method for controlling a fan according to an embodiment of the invention. The ambient temperature, $T_{amb}$, and the temperature, $T_{out}$, of refrigerant leaving the heat rejecting heat exchanger are supplied to a fan speed controller 9. Based thereon, the fan speed controller 9 can derive the temperature difference, $\Delta T = T_{out} - T_{amb}$, and use this as a control parameter for controlling the fan speed.

The fan speed controller 9 further supplies the fan speed to a setpoint calculating unit 10. In the setpoint calculating unit 10 a setpoint value, $\Delta T_{setp}$, is obtained, based on the fan speed received from the fan speed controller 9. The setpoint value, $\Delta T_{setp}$, depends on the fan speed in such a manner that the setpoint value, $\Delta T_{setp}$, increases as the fan speed increases. The setpoint value, $\Delta T_{setp}$, could, e.g., be derived in the manner described above with reference to FIG. 2.

The obtained setpoint value, $\Delta T_{setp}$, is supplied to a selecting unit 11. Furthermore, one or more further setpoint values, $\Delta T_{setp,1}$, $\Delta T_{setp,2}$, is/are supplied to the selecting unit 11. For instance, one of the further setpoint values, $\Delta T_{setp,1}$, could be a user defined setpoint value, and one of the further setpoint values, $\Delta T_{setp,2}$, could be a setpoint value dictated by other parts of the vapour compression system, such as a heat recovery system.

In the selecting unit 11, the largest of the three available setpoint values, $\Delta T_{setp}$, $\Delta T_{setp}$, and $\Delta T_{setp,2}$, is selected as the setpoint value for the temperature difference, $\Delta T$, and the selected setpoint value is supplied to the fan speed controller 9. The fan speed controller 9 then controls the fan speed in order to obtain that the derived temperature difference, $\Delta T$, is substantially equal to the setpoint value received from the selecting unit.

Since $\Delta T_{setp}$, increases as the fan speed increases, $\Delta T_{setp}$ will be selected as the setpoint value by the selecting unit 11 at high fan speeds.

It is noted that, even though the fan speed controller 9, the setpoint calculating unit 10 and the selecting unit 11 are shown as separate units in FIG. 3, it is not ruled out that two or more of the illustrated units 9, 10, 11 could form part of the same physical unit or component. Furthermore, one or more of the units 9, 10, 11 could be implemented in software and executed on one or more microprocessors.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A method for controlling a fan of a vapour compression system, the vapour compression system comprising a compressor, a heat rejecting heat exchanger, an expansion device and an evaporator arranged in a refrigerant circuit, the fan and a controller, said fan being arranged to provide a secondary fluid flow across the heat rejecting heat exchanger, the method comprising the steps of:
   establishing, by the controller, a temperature difference, $\Delta T = T_{out} - T_{amb}$, between a temperature, $T_{out}$, of refrigerant leaving the heat rejecting heat exchanger and a temperature, $T_{amb}$, of ambient air of the heat rejecting heat exchanger,
   establishing, by the controller, a fan speed of the fan,
   obtaining, by the controller, a setpoint value, $\Delta T_{setp}$, for the temperature difference, $\Delta T$, based on the established fan speed of the fan, said setpoint value, $\Delta T_{setp}$, being dependent on the fan speed in such a manner that the setpoint value, $\Delta T_{setp}$, increases as the fan speed increases, and
   controlling, by the controller, the fan speed of the fan in order to control the temperature difference, $\Delta T$, by comparing the established temperature difference, $\Delta T$, to the obtained setpoint value, $\Delta T_{setp}$, and controlling the fan speed on the basis of the comparison.

2. The method according to claim 1, wherein the step of controlling the fan speed of the fan comprises controlling the fan speed in order to obtain that the temperature difference, $\Delta T$, is larger than or equal to the obtained setpoint value, $\Delta T_{setp}$.

3. The method according to claim 2, wherein the step of obtaining the setpoint value, $\Delta T_{setp}$, comprises consulting a look-up table and/or determining the setpoint value, $\Delta T_{setp}$, from a function defining the setpoint value, $\Delta T_{setp}$, as a function of fan speed.

4. The method according to claim 2, wherein the setpoint value, $\Delta T_{setp}$, varies as a linear or piecewise linear function of the fan speed.

5. The method according to claim 2, wherein the step of controlling the fan speed of the fan comprises the steps of:
   comparing the established temperature difference, $\Delta T$, to the obtained setpoint value, $\Delta T_{setp}$, and
   decreasing the fan speed of the fan in the case that $\Delta T < \Delta T_{setp}$.

6. The method according to claim 2, wherein the step of obtaining a setpoint value, $\Delta T_{setp}$, comprises the steps of:
   obtaining a minimum setpoint value, $\Delta T_{setp,min}$, being dependent on the fan speed in such a manner that the minimum setpoint value, $\Delta T_{setp,min}$, increases as the fan speed increases,
   obtaining a system defined setpoint value, $\Delta T_{setp,sys}$, and
   selecting the setpoint value, $\Delta T_{setp}$, as the largest of the minimum setpoint value, $\Delta T_{setp,min}$, and the system defined setpoint value, $\Delta T_{setp,sys}$, $\Delta T_{setp} = \max\{\Delta T_{setp,min}; \Delta T_{setp,sys}\}$.

7. The method according to claim 1, wherein the step of obtaining the setpoint value, $\Delta T_{setp}$, comprises consulting a look-up table and/or determining the setpoint value, $\Delta T_{setp}$, from a function defining the setpoint value, $\Delta T_{setp}$, as a function of fan speed.

8. The method according to claim 7, wherein the setpoint value, $\Delta T_{setp}$, varies as a linear or piecewise linear function of the fan speed.

9. The method according to claim 7, wherein the step of controlling the fan speed of the fan comprises the steps of:
   comparing the established temperature difference, $\Delta T$, to the obtained setpoint value, $\Delta T_{setp}$, and
   decreasing the fan speed of the fan in the case that $\Delta T < \Delta T_{setp}$.

10. The method according to claim 1, wherein the setpoint value, $\Delta T_{setp}$, varies as a linear or piecewise linear function of the fan speed.

11. The method according to claim 10, wherein the step of controlling the fan speed of the fan comprises the steps of:
    comparing the established temperature difference, $\Delta T$, to the obtained setpoint value, $\Delta T_{setp}$, and
    decreasing the fan speed of the fan in the case that $\Delta T < \Delta T_{setp}$.

12. The method according to claim 1, wherein the step of controlling the fan speed of the fan comprises the steps of:
    comparing the established temperature difference, $\Delta T$, to the obtained setpoint value, $\Delta T_{setp}$, and
    decreasing the fan speed of the fan in the case that $\Delta T < \Delta T_{setp}$.

13. The method according to claim 12, wherein the step of controlling the fan speed of the fan further comprises the step of increasing the fan speed of the fan in the case that $\Delta T > \Delta T_{setp}$.

14. The method according to claim 1, wherein the step of obtaining the setpoint value, $\Delta T_{setp}$, comprises the steps of:
    obtaining a minimum setpoint value, $\Delta T_{setp,min}$, being dependent on the fan speed in such a manner that the minimum setpoint value, $\Delta T_{setp,min}$, increases as the fan speed increases,
    obtaining a system defined setpoint value, $\Delta T_{setp,sys}$, and
    selecting the setpoint value, $\Delta T_{setp}$, as the largest of the minimum setpoint value, $\Delta T_{setp,min}$, and the system defined setpoint value, $\Delta T_{setp,sys}$, $\Delta T_{setp} = \max\{\Delta T_{setp,min}; \Delta T_{setp,sys}\}$.

15. The method according to claim 1, wherein the step of establishing the temperature difference, $\Delta T$, comprises obtaining the temperature, $T_{out}$, of refrigerant leaving the heat rejecting heat exchanger and obtaining the temperature, $T_{amb}$, of ambient air of the heat rejecting heat exchanger.

16. A method for adjusting a setpoint value for a temperature difference, $\Delta T$, related to a vapour compression system, the vapour compression system comprising a compressor, a heat rejecting heat exchanger, an expansion device and an evaporator arranged in a refrigerant circuit, the vapour compression system further comprising a fan arranged to provide a secondary fluid flow across the heat rejecting heat exchanger and a controller controlling the fan, the temperature difference, $\Delta T = T_{out} - T_{amb}$, being a temperature difference between a temperature, $T_{out}$, of refrigerant leaving the heat rejecting heat exchanger and a temperature, $T_{amb}$, of ambient air of the heat rejecting heat exchanger, the method comprising the steps of:

establishing, by the controller, a fan speed of the fan, obtaining, by the controller, a setpoint value, $\Delta T_{setp}$, for the temperature difference, $\Delta T$, based on the established fan speed of the fan, said setpoint value, $\Delta T_{setp}$, being dependent on the fan speed in such a manner that the setpoint value, $\Delta T_{setp}$, increases as the fan speed increases, and adjusting, by the controller, the setpoint value for the temperature difference, $\Delta T$, to the obtained setpoint value, $\Delta T_{setp}$.

17. The method according to claim 16, wherein the step of obtaining the setpoint value, $\Delta T_{setp}$, comprises consulting a look-up table and/or determining the setpoint value, $\Delta T_{setp}$, from a function defining the setpoint value, $\Delta T_{setp}$, as a function of fan speed.

18. The method according to claim 16, wherein the setpoint value, $\Delta T_{setp}$, varies as a linear or piecewise linear function of the fan speed.

19. The method according to claim 16, wherein the step of obtaining a setpoint value, $\Delta T_{setp}$, comprises the steps of:

obtaining a minimum setpoint value, $\Delta T_{setp,min}$, being dependent on the fan speed in such a manner that the minimum setpoint value, $\Delta T_{setp,min}$, increases as the fan speed increases, obtaining a system defined setpoint value, $\Delta T_{setp,sys}$, being a substantially constant setpoint value, and selecting the setpoint value, $\Delta T_{setp}$, as the largest of the minimum setpoint value, $\Delta T_{setp,min}$, and the system defined setpoint value, $\Delta T_{setp,sys}$, $\Delta T_{setp} = \max\{\Delta T_{setp,min}; \Delta T_{setp,sys}\}$.

20. The method according to claim 16, wherein the step of establishing the temperature difference, $\Delta T$, comprises obtaining the temperature, $T_{out}$, of refrigerant leaving the heat rejecting heat exchanger and obtaining the temperature, $T_{amb}$, of ambient air of the heat rejecting heat exchanger.

* * * * *